UNITED STATES PATENT OFFICE.

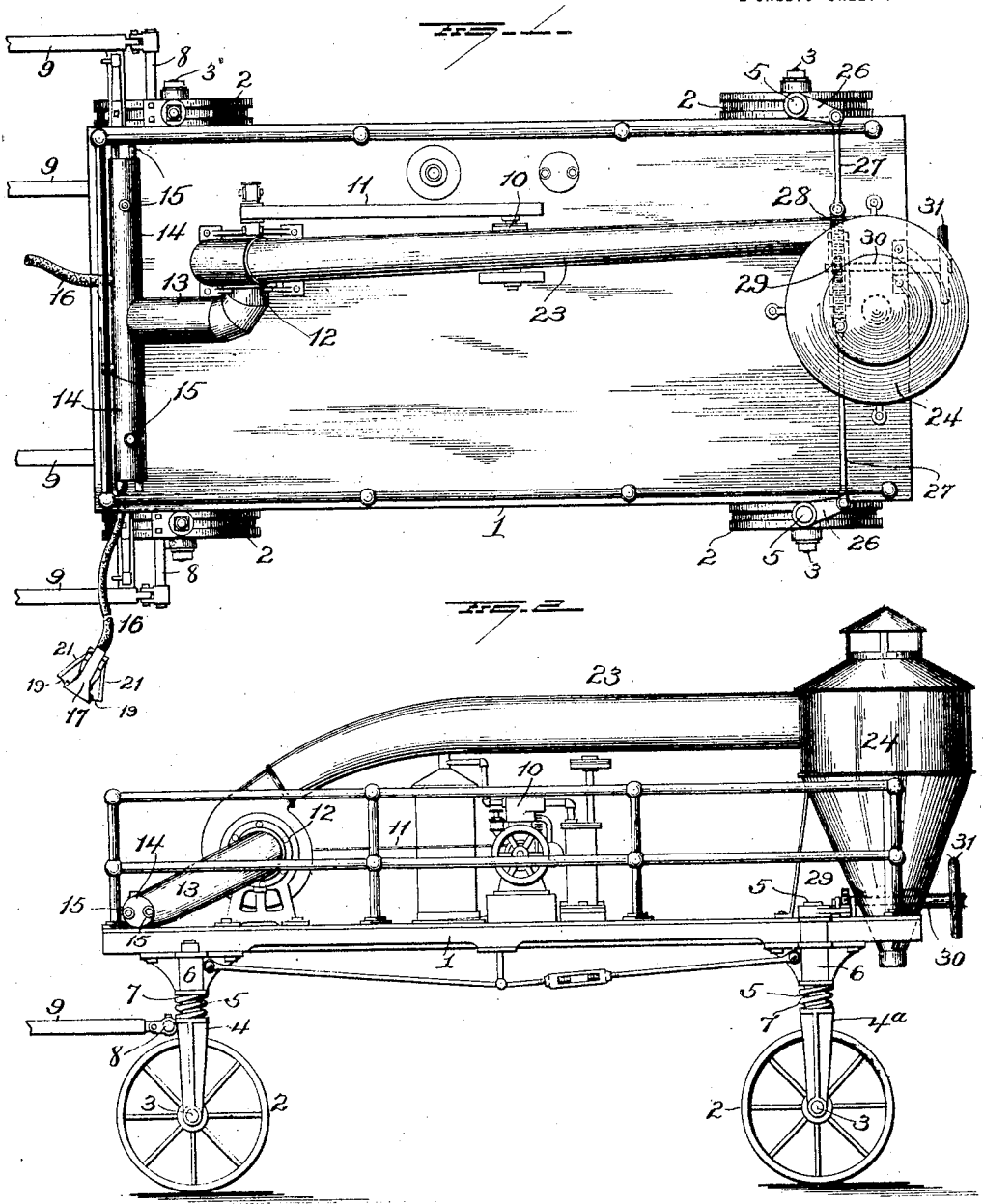

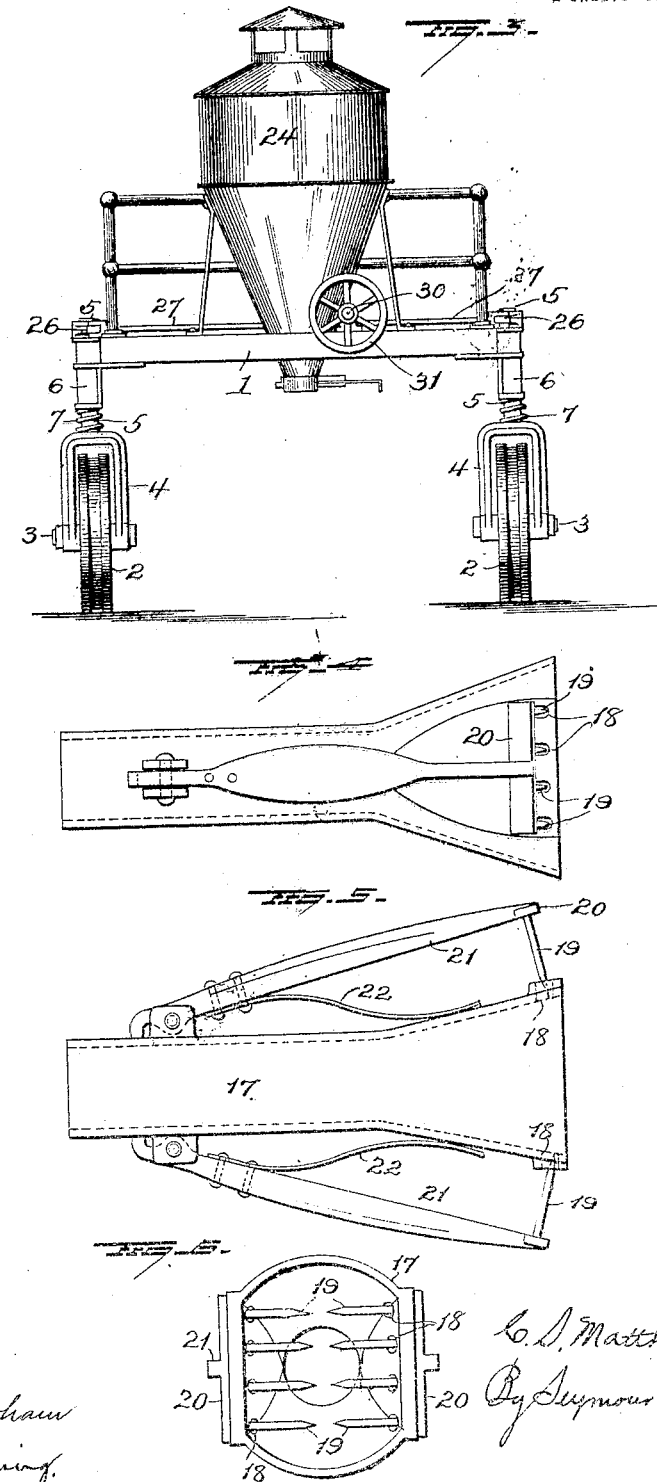

CONRAD SANDIG MATTHIESSEN, OF PHILADELPHIA, PENNSYLVANIA, ASSIGNOR OF ONE-TENTH TO CHARLES J. HEPBURN AND ONE-FIFTH TO WILLIAM M. LONGSTRETH, BOTH OF PHILADELPHIA, PENNSYLVANIA, AND ONE-TENTH TO WARD F. SPRENKEL, OF NEW YORK, N. Y.

COTTON-PICKER.

1,328,385.    Specification of Letters Patent.    Patented Jan. 20, 1920.

Application filed October 1, 1918. Serial No. 256,407.

*To all whom it may concern:*

Be it known that I, CONRAD S. MATTHIESSEN, a citizen of the United States, and a resident of Philadelphia, in the county of Philadelphia and State of Pennsylvania, have invented certain new and useful Improvements in Cotton-Pickers; and I do hereby declare the following to be a full, clear, and exact description of the invention, such as will enable others skilled in the art to which it appertains to make and use the same.

My invention relates to an improvement in cotton pickers and it consists in a vehicle adapted to travel over the cotton plants; one or more, preferably a plurality, of flexible tubes each terminating in a tapering nozzle having means for forcibly removing the cotton from the pod, and pneumatic devices for withdrawing the cotton detached from the pod and depositing it in a hopper.

It further consists in details of construction as will be more fully described and pointed out in the claims.

In the accompanying drawings; Figure 1 is a view in plan of my improvement; Fig. 2 is a view in side elevation of the same; Fig. 3 is a rear end view, and Figs. 4, 5 and 6 are views of the nozzle.

1 represents the vehicle platform or body, having an area sufficient to carry the hopper, engine, pump and conveyer tubes, with clear space for filled bags of cotton, which is removed from the hopper and bagged as the vehicle progresses. This body 1 is mounted on four wheels 2, which travel in the rows between the plants, and each wheel is mounted on a spindle 3 carried at the lower end of the inverted U-shaped wheel carrying frames 4 and 4ª. The wheel carrying frames are each integral with an upright member 5 which latter are mounted in the housings 6 located at the four corners of the body 1, a spring 7 being interposed between the top of each frame 4 and 4ª and the lower end of its bearing 6, for absorbing shocks due to roughness of the ground over which the machine is moving, and also the vibration caused by the engine carried on the body.

Each wheel frame 4 at the front of the machine is provided with a bearing for the bar 8 to which the rear ends of the shafts 9 are pivoted as shown in Figs. 1 and 2. The shafts 9 are so located that a horse travels immediately in front of each wheel, the two horses pulling the machine, walking in the rows with one or more rows of plants between them.

Secured to the body 1 is a light gasolene engine 10 of the water cooled type which is connected by belt 11 with the combined suction fan and blower 12. This combined suction fan and blower is connected by pipe 13 with the manifold 14 preferably located at the front end of the body or platform and extending transversely thereof. This manifold is simply a hollow cylinder into which the cotton is discharged from the flexible picker tubes, and is provided with a series of connections 15 for the attachment of the flexible picker tubes 16, which may be of any suitable construction and material. I prefer to use seven or more picker tubes with each machine, so that all the cotton between the horses and a row or two at each side can be gathered as the machine progresses.

The body of the machine is sufficiently high to pass over the tops of the plants so that the latter are not injured by the passage of the machine, and the flexible tubes 16 are of a length sufficient so that the operatives can work in front of and at the sides of the horses.

Each flexible tube is provided at its front end with a funnel-shaped nozzle 17 open at its front end, and of a size sufficient to receive the largest size cotton boll. These nozzles which are shown in Figs. 4, 5 and 6 are preferably made of a light metal such as aluminum, and are provided at diametrically opposite points, adjacent their free outer ends, with holes 18 for the passage of the teeth 19. These teeth are slender and pointed as shown, and when forced into the nozzle, operate to form a grate like barrier or closure which prevents the withdrawal of the cotton. The teeth 19 at each side of the nozzle are secured to a cross head 20 which is integral with a lever 21, pivoted at its rear end, to the nozzle adjacent the inner end of the latter. These levers are held outwardly with their teeth wholly withdrawn from the interior of the nozzle by the springs 22, which are sufficiently elastic or pliable to permit the teeth to be projected into the nozzle by the fingers of the operatives. This nozzle together with the teeth 19 constitute the picker, and by means of it as will be explained, the cotton is extracted from the pod and drawn by suction into the manifold. The conveyer pipe 13 connects the manifold 14 with the combined suction fan and blower 12, and the cotton which is drawn into the flexible picker tube passes into the manifold, and from the latter through conveyer pipe 12 to the combined fan and blower, and is then blown through the spout 23 to the hopper 24 located at the rear end of the body or platform 1 of the vehicle. This hopper is provided with a door for the removal of the cotton, which is removed from time to time, and bagged, the bags being set on the platform and body and transported to the end of the furrow or row or other clearing where they are deposited to be subsequently picked up and carried to the gin.

Each of the shafts 9 is connected to a front wheel 2 and the latter are therefore guided in their movements by the movements of the horses. The upright members 5 carrying the rear wheel frames 4ᵃ are each provided with a lever arm 26, and the two arms are connected by the rods 27 and the rack 28, the two ends of the rack being connected to the inner ends of the rods so as to provide a connection that will be sufficiently flexible to permit the rear wheels 2 to yield vertically independently in traversing an uneven surface. The rack bar 28 is in mesh with the pinion 29 which is secured to shaft 30 mounted in bearings at the rear end of the body or platform 1 and provided with the hand wheel 31 by which it is actuated to shift the wheels for making a short turn at the end of the furrow or field. By connecting the front wheels with the shafts 9, and connecting the rear wheels so that they may be shifted in unison, the vehicle can be quickly manipulated to place it in proper position for entrance to the cotton field, and can be turned a comparatively small space at the end of the field.

As shown in Fig. 1, the engine and its associated parts are located to one side of the body or platform 1 so as to leave the major part of the latter clear for the storage of filled bags of cotton.

After the combined fan and blower has been started, there is a strong suction through each nozzle, and these nozzles are placed by the operatives over the ripe cotton bolls and the teeth 19 forced inwardly by pressure against the levers 21. The teeth penetrate the cotton and the latter is then extracted from the pod by a pull on the nozzle. After the cotton and its seed have been manually pulled from the pod, it is caught by the suction and carried rearwardly as explained to the hopper. By this arrangement the cotton is forcibly extracted from the pod by the manual operation of the pickers and is then conveyed by suction after it has been freed, from the pod.

It is evident that many slight changes might be resorted to in the relative arrangement of parts shown and described without departing from the spirit and scope of my invention. Hence I would have it understood that I do not wish to confine myself to the exact construction and arrangement of parts shown and described but, Having fully described my invention what I claim as new and desire to secure by Letters-Patent, is:—

1. In a cotton picker, the combination of a vehicle having a suction apparatus thereon, a flexible tube connected with said apparatus, a nozzle at the end of the flexible tube and provided with a series of holes near its outer open end, a lever pivoted to the nozzle and carrying a series of teeth adapted to pass through the holes in the nozzle and be projected across the open end of the nozzle, and a spring for yieldingly holding the teeth normally clear of the open end of the nozzle, the said nozzle adapted to be carried by the operator and the lever manipulated by manual pressure applied directly to the same.

2. In a cotton picker, the combination of a vehicle having a suction apparatus thereon, a flexible tube connected with said apparatus, a nozzle at the end of the flexible tube and provided with oppositely disposed holes near its outer open end, two levers pivoted to the nozzle and carrying teeth adapted to pass through the said holes in the nozzle and be projected across the open end of the latter, and springs for yieldingly holding the teeth of each lever normally clear of the open end of the nozzle, the said nozzle adapted to be carried by the operator and the levers manipulated by manual pressure directly applied to the same.

3. In a cotton picker, the combination of a platform mounted on wheels each of the latter adapted to swivel on a vertical axis, an independent draft attachment connected with each front wheel, pneumatic devices carried on the platform, and flexible picker tubes connected with the suction devices.

4. In a cotton picker, the combination of a platform mounted on wheels each of the latter adapted to swivel on a vertical axis, an independent draft attachment connected with each front wheel, connections between the rear wheels whereby they are shifted simultaneously, pneumatic devices carried on the platform and flexible picker tubes connected with said pneumatic devices.

5. In a cotton picker, the combination of a vehicle having a suction apparatus thereon, a flexible tube connected with said apparatus, a nozzle at the end of the flexible tube, levers carried by the tube and having jaws adapted to be moved across the open end of the nozzle to engage the cotton, and a spring for yieldingly holding the jaws normally separated, the said nozzle adapted to be carried by the hand and the levers manipulated by manual pressure directly applied to the same.

In testimony whereof, I have signed this specification in the presence of two subscribing witnesses.

CONRAD SANDIG MATTHIESSEN.

Witnesses:
F. W. WALLING,
T. C. GREER.